United States Patent
Lee et al.

(10) Patent No.: US 8,402,018 B2
(45) Date of Patent: Mar. 19, 2013

(54) SEMANTIC SEARCH SYSTEM USING SEMANTIC RANKING SCHEME

(75) Inventors: Ji-Hyun Lee, Daejeon (KR); Chin-Wan Chung, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 222 days.

(21) Appl. No.: 12/705,147

(22) Filed: Feb. 12, 2010

(65) Prior Publication Data

US 2011/0202526 A1    Aug. 18, 2011

(51) Int. Cl.
*G06F 7/00*      (2006.01)
*G06F 17/00*     (2006.01)
*G06F 17/30*     (2006.01)

(52) U.S. Cl. .................... 707/723; 707/739; 707/899

(58) Field of Classification Search .................. 707/616, 707/804, 797; 709/203; 704/9
See application file for complete search history.

(56) References Cited

U.S. PATENT DOCUMENTS

| | | | | |
|---|---|---|---|---|
| 7,295,967 | B2 * | 11/2007 | Corman et al. | 704/9 |
| 7,502,819 | B2 * | 3/2009 | Alonso | 709/203 |
| 7,693,887 | B2 * | 4/2010 | McLaughlin | 707/616 |
| 7,761,480 | B2 * | 7/2010 | Toledano et al. | 707/804 |
| 2010/0131563 | A1 * | 5/2010 | Yin | 707/794 |

OTHER PUBLICATIONS

Lee, Jihyun et al., "An effective semantic search technique using ontology," Proceedings of the 18th International Conference on World Wide Web, Poster Session, pp. 1057-1058 (2009).
Rocha, Cristiano et al., "A Hybrid Approach for Searching in the Semantic Web," Proceedings of the 13th International Conference on World Wide Web, Poster Session, pp. 374-383 (2004).
Stojanovic, Nenad et al., "An Approach for the Ranking of Query Results in the Semantic Web," Lecture Notes in Computer Science, vol. 2870:500-516 (2003).

* cited by examiner

*Primary Examiner* — Susan Chen
(74) *Attorney, Agent, or Firm* — Nelson Mullins Riley & Scarborough LLP; EuiHoon Lee, Esq.

(57) ABSTRACT

A semantic search system using a semantic ranking scheme including: an ontology analyzer analyzing ontology data related to a search target to determine a weight value of each property according to a weighing method for property; a semantic path extractor extracting all the semantic paths between resources and query keywords and determining a weight value of each extracted semantic path according to the semantic path weight value determination scheme by using the weight value of each property; a relevant resource searcher traversing an instance graph of ontology based on a semantic path having a pre-set length and weight value of more than an expectation level to search resources that have a semantic relationship with the query keywords and are declared as a type presented in the query; and a semantic relevance ranker selecting a top-k results having the highest rank from among the candidate results extracted by the relevant resource researcher by using a relevance scoring function.

5 Claims, 5 Drawing Sheets

| ID | DBLP Query | #A |
|---|---|---|
| DQ1 | <article,{ 'software', 'testing'}><br>U: Article about software testing | 25 |
| DQ2 | <person,{ 'multimedia', 'index', 'database'}><br>U: Author who writes publications about indexing on multimedia database | 30 |
| DQ3 | <publication,{ 'top-k', 'relational', 'database', '2002', '2003'}><br>U: Publication which is about top-k answering on relational database and was published in 2002 or 2003 | 6 |
| DQ4 | <inproceeding,{ 'face', 'recognition', 'artificial', 'intelligence'}><br>U: Inproceeding about face recognition in artificial intelligence field | 12 |
| DQ5 | <inproceeding,{ 'relevance', 'feedback', 'multimedia', 'database'}><br>U: Inproceeding about relevance feedback in multimedia database field | 22 |
| ID | IMDB Query | #A |
| IQ1 | <company,{ 'japan', 'animation'}><br>U: Japanese company which produces animations | 29 |
| IQ2 | <actor,{ 'romance', 'comedy'}><br>U: Actor who acts in romance-comedy films | 44 |
| IQ3 | <film,{ 'steven', 'spielberg', 'adventure'}><br>U: Adventure film directed by steven spielberg | 14 |
| IQ4 | <film,{ 'jane', 'austen', 'pride', 'prejudice'}><br>U: Film originated from 'pride prejudice' of jane austen | 19 |
| IQ5 | <music,{ 'jesus', 'christ', 'superstar', '1973'}><br>U: Soundtrack of 'jesus christ superstar' produced in 1973 | 27 |

FIG. 5

SEMANTIC SEARCH SYSTEM USING SEMANTIC RANKING SCHEME

BACKGROUND OF THE INVENTION

1. Field of the Invention

The present invention relates to a semantic search system based on semantic relationship information between resources described on an ontology and, particularly, to a search technique that ranks resources by using a relevance scoring function reflecting the number of meaningful semantic paths between resources and keywords, the coverage of keywords, and the distinguishability of keywords related to the resources, and provides ranked resources to users. More particularly, the present invention relates to a semantic search technique capable of automatically weighting various semantic relationships between resources without the intervention of an expert, thus effectively utilizing the present invention, irrespective of the complexity and size of ontology, and effectively handling queries consisting of one or more keywords with different importance.

2. Description of the Related Art

Currently, a keyword-based search, a search scheme provided by a search engine, basically ranks query results according to whether or not a resource as a search subject (or search target) has a keyword and the number of keywords included in the resource, and provides ranked query results to a user. In this case, the accuracy of the search results is very low since the keyword-based search is ignorant of the type of resources and the semantic relationships between the resources and keywords. In an effort to solve this problem, a semantic search utilizing ontology clarifying a semantic relationship between a type of resource and a resource has been proposed.

The related art of the semantic search includes N. Stojanovic, R. Studer, and K. Stojanovic, "An Approach for the Ranking of Query Results in the Semantic Web," published in the Proc. of ISWC, pages 500-516, October 2003 (referred to as a 'relevant research 1', hereinafter), and C. Rocha, D. Schwabe, and M. P. de Aragao, "A Hybrid Approach for Searching in the Semantic Web," published in the Proc. of WWW, pages 374-383, 2004 (referred to as a 'relevant research 2', hereinafter).

The relevant researches 1 and 2, propose a ranking scheme based on semantic relationship information between the resources described in ontology, in order to enhance the accuracy of a semantic search. In the ranking scheme proposed in the relevant researches 1 and 2, the ranks of search target resources are determined in consideration of the amount of semantic relationships between resources and the specificity of the semantic relationships through a link analysis of the ontology. Because this scheme takes the semantic relations between a keyword and a resource into consideration in performing a search, the accuracy is improved to be better than the existing keyword-based search.

However, in the case of using the ranking scheme of the semantic relationships, the diversity of the semantic relationships must be considered to ensure a more accurate search. For example, the sentences 'interested in a topic' and 'write a publication about a topic' each have a different importance in describing or explaining a person. Namely, 'write' is a more detailed and informative descriptor. In other words, the diversity of the semantic relationship between a resource a particular keyword means that the semantic relationships between a resource and a keyword have a different importance in determining a resource relevant score with respect to a particular keyword.

In this respect, however, the scheme proposed in relevant research 1 does not consider the diversity of the semantic relationships, resulting in low search accuracy. Also, the scheme proposed in relevant research 2 is disadvantageous in that a domain expert manually (or passively) assigns a weight value according to the diversity of the semantic relations, so it is impractical to be applied to a complicated, large ontology. In addition, the above-described related arts have the shortcomings in that they cannot effectively handle a query consisting of one or more keywords with different importance.

SUMMARY OF THE INVENTION

An aspect of the present invention provides a semantic search system capable of retrieving the most relevant top-k resources by using a relevance scoring function reflecting the number of meaningful semantic paths between resources and keywords, the coverage of keywords, and the distinguishability of keywords related to the resources, and providing the top-k resources to the user. In particular, the present invention provides a semantic search system using a semantic ranking scheme capable of automatically capable of automatically weighting various semantic relationships between resources used for the relevance scoring function without the intervention of an expert, thereby effectively utilizing it regardless of the complexity and size of ontology, and effectively handling a queried consisting of one or more keywords with different importance.

According to an aspect of the present invention, there is provided a semantic search system using a semantic ranking scheme including: an ontology analyzer analyzing ontology data related to a search target to determine a weight value of each property according to a weighing method for property; a semantic path extractor extracting all the semantic paths between resources and query keywords and determining a weight value of each extracted semantic path according to the semantic path weight value determination scheme by using the weight value of each property; a relevant resource searcher traversing an instance graph of the ontology based on a semantic path having a pre-set length and weight value of more than an expectation level to search resources that have a semantic relationship with the query keywords and are declared as a type presented in the query; and a semantic relevance ranker selecting an top-k results having the highest rank from among the candidate results extracted by the relevant resource researcher by using a relevance scoring function.

BRIEF DESCRIPTION OF THE DRAWINGS

The above and other aspects, features and other advantages of the present invention will be more clearly understood from the following detailed description taken in conjunction with the accompanying drawings, in which:

FIG. 5 illustrates an example of representative queries of each data used for measuring accuracy of the semantic ranking scheme according to an exemplary embodiment of the present invention;

DETAILED DESCRIPTION OF THE PREFERRED EMBODIMENT

Figure 1:
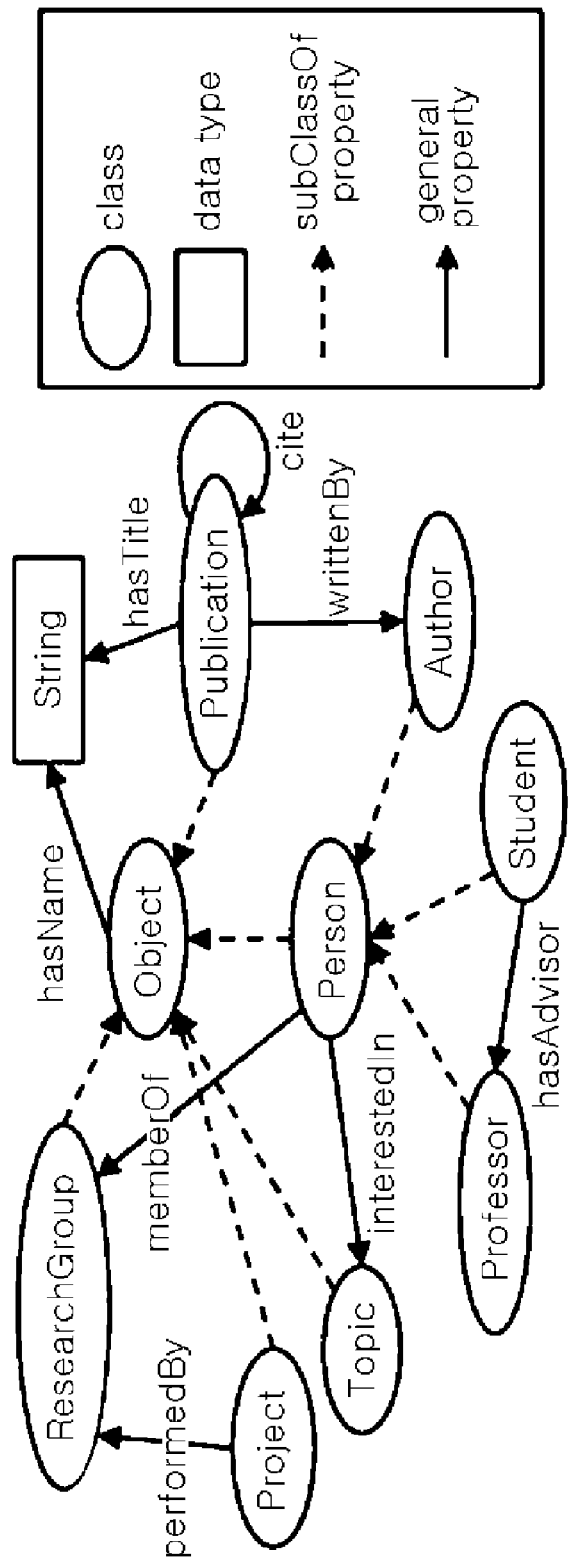
FIG. 1 illustrates an ontology schema.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In describing the present invention, if a detailed explanation for a related known function or construction is considered to unnecessarily divert from the gist of the present invention, such explanation will be omitted but would be understood by those skilled in the art. The same elements or equivalents are referred to by the same reference numerals throughout the specification.

It will be understood that when an element is referred to as being "connected with" another element, it can be directly connected with the other element or may be indirectly connected with the other element with element(s) interposed therebetween. Unless explicitly described to the contrary, the word "comprise" and variations such as "comprises" or "comprising," will be understood to imply the inclusion of stated elements but not the exclusion of any other elements.

In order to help understand the present invention, the contents of ontology, semantic path and semantic search will be described as follows before describing a semantic search system using a semantic ranking scheme according to an exemplary embodiment of the present invention.

Ontology

Ontology includes a schema (S) and an instance graph (G).

The schema S is defined as <C, D, P> where C is a set of classes, D is a set of data types, and P is a set of properties. Here, class is a type of resource. Property is a semantic relationship that may exist between resources, which is defined as p(d,r). Here, d is a domain, r is a range, and the conditions of d∈C and r∈C∪D are satisfied. FIG. 1 illustrates an example of an ontology schema.

The instance graph G includes a class instance and a property instance. In the instance graph, a node is a class instance and a trunk line is a property instance. The property instance has a subject and an object, and these are class or data type instances coming as a domain or range.

Figure 2:
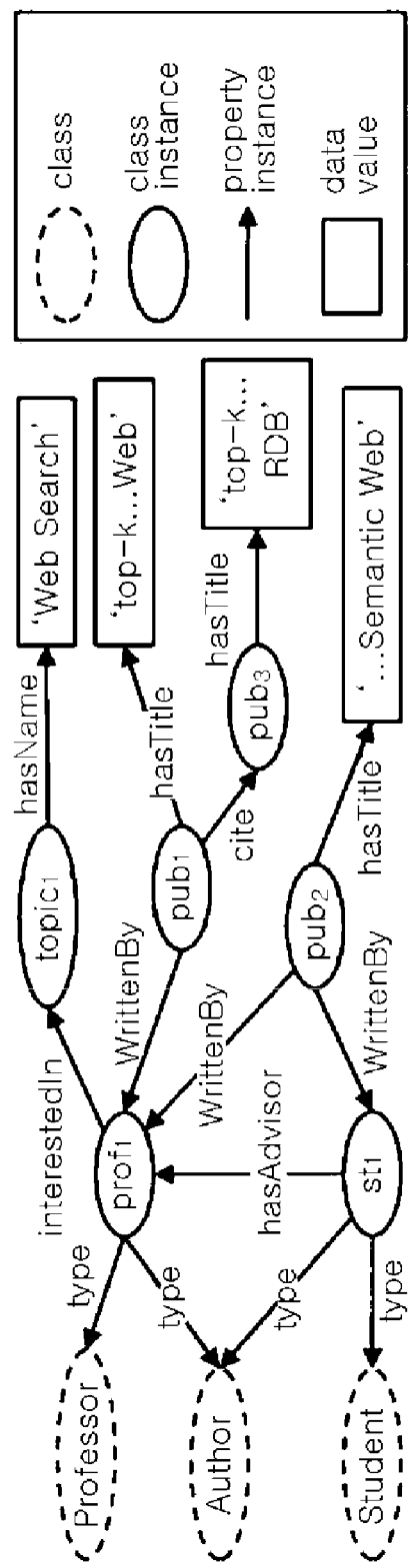
FIG. 2 shows an example of an ontology instance graph.

FIG. 2 shows an example of an ontology instance graph.

Semantic Path

A semantic path is defined as a sequence of properties existing on a schema. There is a semantic path instance mapped to the semantic path on an instance graph.

For example, a semantic path "writtenBy$^{-1}$(Professor, Publication) hasTitle(Publication, String)" exists in the ontology schema illustrated in FIG. 1, and a semantic path instance "writtenBy$^{-1}$(profl, pub1) hasTitle(pub1, 'top-k ... Web')", mapped to the semantic path, exists in the ontology instance graph illustrated in FIG. 2.

Semantic Search

A semantic search is finding a solution A to a query Q. In detail, the query Q is defined as <T, K>, in which T refers to a type of a resource desired by a user and K refers to a set of keywords describing a resource. A semantic search is finding or searching for a resource related to keywords belonging to K by way of one or more semantic path instances among resources declared as T in ontology.

According to a semantic search, there are innumerable resources related to query keywords by way of one or more semantic path instances. Thus, a ranking scheme according to resource relevance score is required in order for a user to easily and quickly access query results with a high relevance score. Thus, the present invention provides more accurate search results through an effective semantic ranking scheme in consideration of various semantic relationships between resources and keywords to users.

Figure 3:
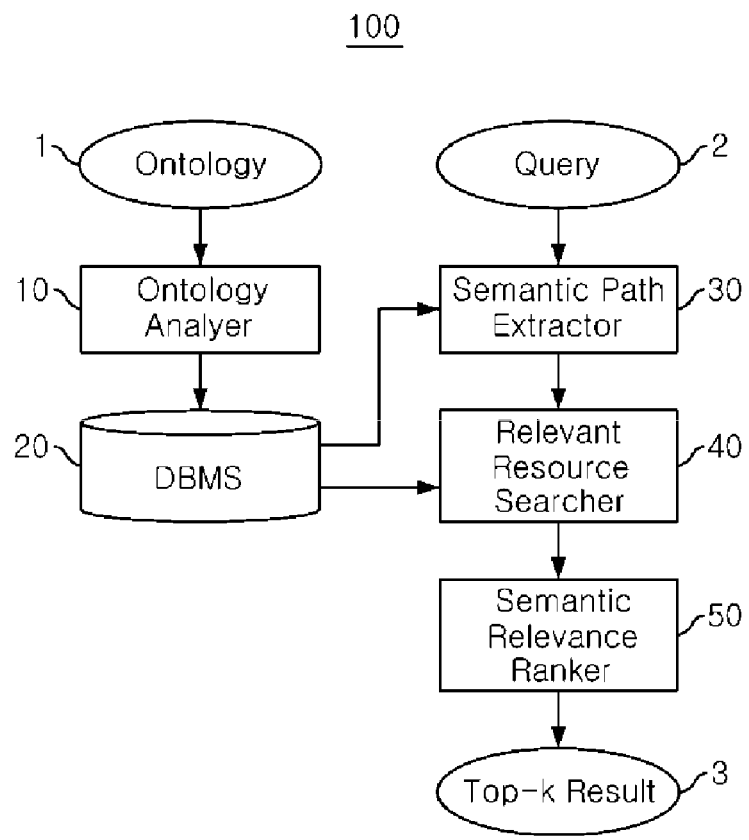
FIG. 3 is a schematic block diagram of a semantic search system using a semantic ranking scheme according to an exemplary embodiment of the present invention.

FIG. 3 is a schematic block diagram of a semantic search system using a semantic ranking scheme according to an exemplary embodiment of the present invention. The semantic search system 100 includes an ontology analyzer 10, a database management system (DBMS) 20, a semantic path extractor 30, a relevant resource searcher 40, and a semantic relevance ranker 50.

The ontology analyzer 10 analyzes ontology data 1 related to a search target to obtain a weight value of each property, and stores the obtained weight values together with the ontology data in the DBMS 20. In this case, the ontology analyzer 10 determines the weight value of each property according to a property weighing method to be described.

According to the property weighing method, a property weight value is determined depending on i) a subject discriminative power of a property, and ii) a predictability of a subject given the object, and vice versa, of a property.

Subject Discriminative Power of Property

A subject discriminative power of a property is measured with the amount of information that can be obtained through the existence of a property. When pr(p(d,r)) is a probability that an arbitrary resources becomes a subject of a property p(d,r), a subject discriminative power I(p(d,r)) of the property p(d,r) is calculated by Equation 1 shown below:

$$I(p(d,r)) = -\log_2 pr(p(d,r))$$ [Equation 1]

Here, pr(p(d,r))=|sub(p(d,r))|/|N|, sub(p(d,r)) indicates a set of subjects of p(d,r) on the instance graph, and N indicates a set of all resources on the instance graph.

For example, when it is assumed that there are 1000 resources on the ontology, 600 people are interested in a particular topic (interestedIn), and 100 people are authors of treatises (writtenBy$^{-1}$), a subject discriminative power of interestedIn(Person, Topic) and writtenBy$^{-1}$(Author, Publication) is calculated by Equation 2 shown below:

$$I(interestedIn(\text{Person, Topic})) = -\log_2 pr$$ [Equation 2]
$$(interestedIn(\text{Person, Topic})) =$$
$$-\log_2 \frac{600}{1,000} = -\log_2 0.6 \approx 0.73$$

$$I(writtenBy^{-1}(\text{Author, Publication})) = -\log_2 pr$$
$$(writtenBy^{-1}(\text{Author, Publication})) =$$
$$-\log_2 \frac{100}{1,000} = -\log_2 0.1 \approx 3.32.$$

Predictability of a Subject Given the Object, and Vice Versa, of a Property

A predictability of a subject given the object, and vice versa, of a property MI(p(d,r)) indicates the ability of predicting an object when a subject of a property is given or the ability of predicting a subject when an object of a property is given, which is calculated by Equation 3 shown below:

$$MI(p(d, r)) = \sum_{o \in r} \sum_{s \in d} pr(s, o) \cdot \log_2\left(\frac{pr(s, o)}{pr(s)pr(o)}\right)$$ [Equation 3]

Here, pr(s) indicates the probability that the property p(d,r) has s as a subject on the instance graph, pr(o) indicates the probability that the property p(d,r) has o as an object on the instance graph, and pr(s,o) indicates the probability that the property p(d,r) has s and o as a subject and an object, respectively.

Figure 4:
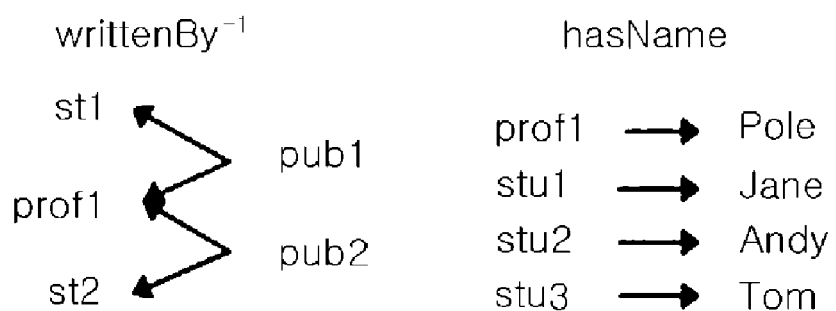
FIG. 4 illustrates a predictability of a subject given the object, and vice versa, of a property according to an exemplary embodiment of the present invention.

FIG. 4 illustrates the predictability of a subject given the object, and vice versa, of a property according to an exemplary embodiment of the present invention. In FIG. 4, predictabilities of a subject given the object, and vice versa, of a writtenBy$^{-1}$ property and a hasName property are calculated by Equation 4 shown below:

$$MI(writtenBy^{-1}(Author, Publication)) = \qquad [\text{Equation 4}]$$

$$pr(st_1, pub_1) \cdot \log_2\left(\frac{pr(st_1, pub_1)}{pr(st_1)pr(pub_1)}\right) +$$

$$pr(prof_1, pub_1) \cdot \log_2\left(\frac{pr(prof_1, pub_1)}{pr(prof_1)pr(pub_1)}\right) +$$

$$pr(prof_1, pub_2) \cdot \log_2\left(\frac{pr(prof_1, pub_2)}{pr(prof_1)pr(pub_2)}\right) +$$

$$pr(st2, pub2) \cdot \log_2\left(\frac{pr(st2, pub2)}{pr(st2)pr(pub2)}\right) =$$

$$\frac{1}{4} \cdot \log_2\left(\frac{\frac{1}{4}}{\frac{1}{4} \cdot \frac{1}{2}}\right) + \frac{1}{4} \cdot \log_2\left(\frac{\frac{1}{4}}{\frac{1}{2} \cdot \frac{1}{2}}\right) +$$

$$\frac{1}{4} \cdot \log_2\left(\frac{\frac{1}{4}}{\frac{1}{2} \cdot \frac{1}{2}}\right) + \frac{1}{4} \cdot \log_2\left(\frac{\frac{1}{4}}{\frac{1}{4} \cdot \frac{1}{2}}\right) = 0.5.$$

$$MI(hasName(Person, String)) =$$

$$pr(prof_1, Pole) \cdot \log_2\left(\frac{pr(prof_1, Pole)}{pr(prof_1)pr(Pole)}\right) +$$

$$pr(st_1, Jane) \cdot \log_2\left(\frac{pr(st_1, Jane)}{pr(st_1)pr(Jane)}\right) +$$

$$pr(st_2, Andy) \cdot \log_2\left(\frac{pr(st_2, Andy)}{pr(st_2)pr(Andy)}\right) +$$

$$pr(st_3, Tom) \cdot \log_2\left(\frac{pr(st_3, Tom)}{pr(st_3)pr(Tom)}\right) =$$

$$\frac{1}{4} \cdot \log_2\left(\frac{\frac{1}{4}}{\frac{1}{4} \cdot \frac{1}{4}}\right) + \frac{1}{4} \cdot \log_2\left(\frac{\frac{1}{4}}{\frac{1}{4} \cdot \frac{1}{4}}\right) +$$

$$\frac{1}{4} \cdot \log_2\left(\frac{\frac{1}{4}}{\frac{1}{4} \cdot \frac{1}{4}}\right) + \frac{1}{4} \cdot \log_2\left(\frac{\frac{1}{4}}{\frac{1}{4} \cdot \frac{1}{4}}\right) = 2.$$

Weight Value of Property

A weight value $w(p(d,r))$ of a property is determined by Equation 5 shown below by using the subject discriminative power $I(p(d,r))$ of the property and the predictability of a subject given the object, and vice versa, of a property $MI(p(d,r))$ as calculated described above:

$$w(p(d,r)) = \alpha \cdot I(p(d,r)) + \beta \cdot MI(p(d,r)) \qquad [\text{Equation 5}]$$

Here, $\alpha$ and $\beta$ are tuning parameters, satisfying the condition of $0 \leq \alpha, \beta \leq 1$, and the values of $I(p(d,r))$ and $MI(p(d,r))$ are normalized as $[0,1]$.

Upon receiving a user query 2, the semantic path extractor 30 extracts every possible semantic relationship (namely, semantic paths) between resources and query keywords, and calculates weight values with respect to the extracted semantic paths through a weighting method for semantic paths by using the weight values of the respective properties stored in the DBMS 20.

A weight value of a semantic path sp is determined by adding the weight values of the respective properties constituting the semantic path. In general, the longer a semantic path, the lower the relevance score between two resources connected by the semantic path. Thus, simply obtaining the sum or an average as a way to add the weight values of the respective properties is not appropriate. In an exemplary embodiment of the present invention, in order to reduce a weight value as the semantic path becomes longer, the weight values of the respective properties are normalized to have a value between $[\min\{w(p(d,r))\}/\max\{w(p(d,r))\}, 1]$, which are then multiplied to calculate a weight value of the semantic path. In addition, a penalty over the length of the semantic path is controlled by using a tuning parameter. A weight value $W(sp)$ of a semantic path sp is calculated by Equation 6 shown below:

$$W(sp) = \left(\prod_{p(d,r) \in sp} w(p(d, r))\right) \cdot \delta^{length(sp)-1} \qquad [\text{Equation 6}]$$

Here, length(sp) indicates the number of properties constituting the semantic path sp, while $\delta$ is a tuning parameter reflecting a penalty over the length of the semantic path, having a value between 0 and 1. For example, when, $w(writtenBy^{-1})=0.7$, $w(hasTitle)=1$, and $\delta=0.6$, a weight value of a semantic path writtenBy$^{-1}$(Author, Publication) hasTitle (Publication, String) is 0.42 (=0.7*1*0.6). Every semantic path instance corresponding to a particular semantic path has a weight value of the corresponding semantic path.

The relevant resource searcher 40 traverses the instance graph of the ontology based on the semantic paths having a pre-set length and a weight value more than an expectation level according to a semantic search to search resources that have a semantic relationship with query keywords and are declared as the type presented in the query, to thereby extracting candidate results.

The semantic relevance ranker 50 selectively provides top-k results with the highest rank among the candidate results extracted by the relevant resource searcher 40 by using a relevance scoring function to be described.

The relevance scoring function proposed in the present invention reflects i) the number of meaningful semantic paths between resources and keywords, ii) the coverage of keywords, and iii) the distinguishability of keywords related to the resources.

The Number of Meaningful Semantic Paths Between Resources and Keywords

A resource having a relationship with a query keyword through more important semantic paths could be a result more suitable for a query. The weight of a semantic path is calculated through a weighting method for a semantic path as described above. A relevance $R(a, k_i)$ to a keyword $k_i$ of a certain resource 'a' is calculated by Equation 7 shown below:

$$R(a, k_i) = \sum_{ip \in IP(a,k_i)} W(ip), \text{ for } k_i \in K \qquad [\text{Equation 7}]$$

Here, $IP(a,k_i)$ is a set of every semantic path instances existing between the resource 'a' and the key word $k_i$.

The Coverage of Keywords

Users prefer a resource having relevance to a larger number of query keywords. Thus, in order to reflect the user preference, in the present invention, an extended Boolean model is applied. When the number of query keywords is n, a certain resource is mapped to a point in n-dimensional space. A coordinate value of each dimension represents the relevance of a resource to corresponding keywords. Thus, relevance $Cov(a,K)$ of a resource 'a' to the n number of keywords is the converse of the distance from an ideal position $[1, \ldots, 1]$ to the resource 'a', which is calculated by Equation 8 shown below:

$$\text{Cov}(a, K) = 1 - \left[\frac{\sum_{1 \leq i \leq |K|} (1 - NR(a, k_i))^p}{|K|}\right]^{\frac{1}{p}} \quad \text{[Equation 8]}$$

Here, $NR(a,k_i)$ is the relevance of the resource 'a' to the keyword $k_i$ normalized as a value between 0 and 1, which is calculated by Equation 9 shown below. Also, p is a tuning parameter controlling AND-semantics. As p increases, the AND-semantics between keywords is intensified, which means that when a resource has a relationship with every query keyword possible, it can be admitted as query results.

$$NR(a, k_i) = \frac{R(a, k_i)}{\max_{a_m \in A} R(a_m, k_i)} \text{ for } k_i \in K \quad \text{[Equation 9]}$$

The Distinguishability of Keywords Related to the Resources

In general, as a keyword discriminates resources more properly, it greatly affects the discriminating of resources desired by a user. Thus, in an exemplary embodiment of the present invention, the distinguishability of a keyword is indicated as a discriminative power $D(k_i)$ of the keyword, which is calculated by Equation 10 shown below:

$$D(k_i) = \frac{irf(k_i)}{\max_{k_m \in K} irf(k_m)} \quad \text{[Equation 10]}$$

Here, $irf(k_i)$ is calculated by Equation 11 shown below:

$$irf(k_i) = \log \frac{|DV|}{|DV_{k_i}|} \quad \text{[Equation 11]}$$

Here, DV is a set of data values on the instance graph, and $DV_{Ki}$ is a set of data values including the keyword $k_i$.

Relevance Scoring Function

Finally, a relevance scoring function Rank(a,K) with respect to a set of query keywords K of the resource 'a' is represented by Equation 12 shown below, reflecting the three elements obtained as described above.

$$\text{Rank}(a, K) = 1 - \left[\frac{\sum_{1 \leq i \leq |K|} (D(k_i) \cdot (1 - NR(a, k_i)))^p}{\sum_{1 \leq i \leq |K|} D(k_i)^p}\right]^{\frac{1}{p}} \quad \text{[Equation 12]}$$

In order to measure the accuracy of the semantic ranking scheme (SRS) proposed by the present invention, comparative experimentation was conducted under the following conditions.

Ontology established based on two real data sets of the DBLP(Digital Bibliography & Library Project) and the IMDB(The Internet Movie Database) was used.

In addition, F-measure (=(2*precision*recall)/(precision+recall) was used as a measure indicating accuracy.

Also, the ranking schemes (RQR) proposed in the relevant research 1, the ranking scheme (HAS) proposed in the relevant research 2, and the search engines provided by DBLP and IMDB were used as comparison targets.

Moreover, a query consisting of two to five query keywords with different importance was used, and twenty semantic queries were used for the DBLP while fifteen semantic queries were used for the IMDB. FIG. 5 illustrates an example of representative queries of each data set used for measuring the accuracy of the semantic ranking scheme according to an exemplary embodiment of the present invention. Here, U indicates the meaning of a user query and # A indicates the number of resources related to an actual query.

Furthermore, as tuning parameters, in the case of the weighting method for property, $\alpha$ was set as 0.2 and $\beta$ was set as 0.8, while in case of the weighting method for semantic path, $\delta$ was set as 0.6.

Figure 6:
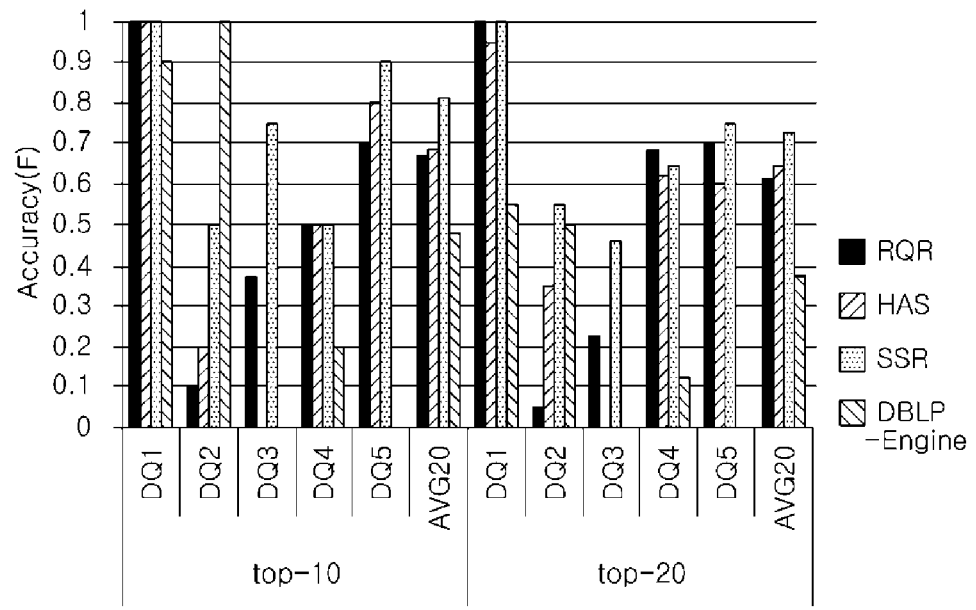
FIG. 6 is a graph showing query processing results with respect to DBLP data.
Figure 7:
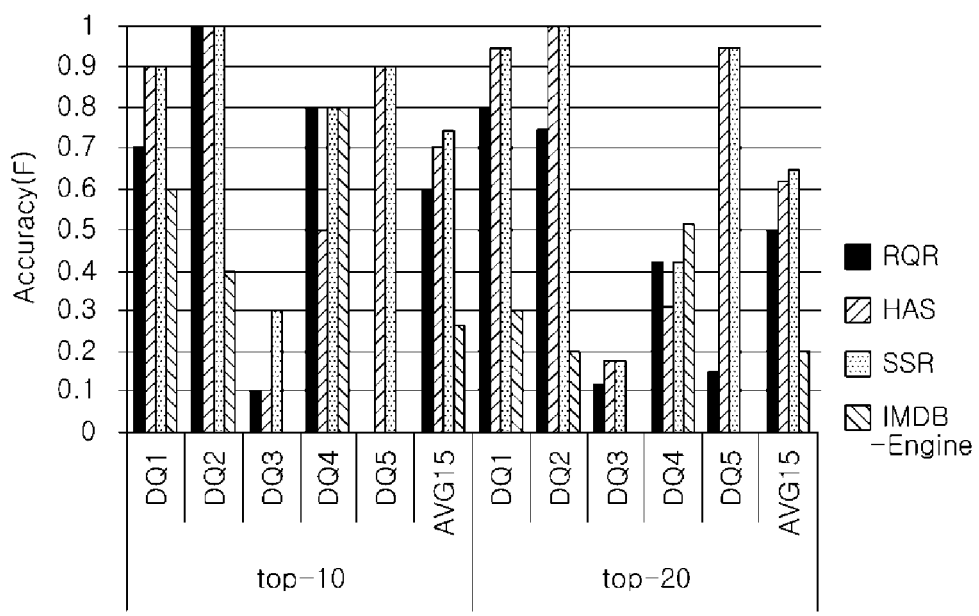
FIG. 7 is a graph showing query processing results with respect to IMDB data.

FIG. 6 is a graph showing query processing results with respect to DBLP data, and FIG. 7 is a graph showing query processing results with respect to IMDB data. In FIG. 6, AVG20 indicates an average accuracy with respect to twenty DBLP queries, and in FIG. 7, AVG15 indicates an average accuracy with respect to fifteen IMDP queries.

The results of the comparative experimentation conducted under the conditions as described above show that the semantic ranking scheme according to the present invention provides a higher amount of accuracy than the existing ranking scheme including the DBLP and IMDB search engines as illustrated in FIGS. 6 and 7.

As set forth above, according to exemplary embodiments of the invention, the accuracy of searching can be improved since searching is performed in consideration of a type of a resource and a semantic relationship between the resource and a keyword, which are disregarded in the related art keyword-based searching. Namely, in performing searching, the results including less relevance can be reduced and results having relevance, but missed in the related art keyword-based search, can be provided to a user.

In addition, the user can easily obtain desired search results since a high ranking is provided to the query result with a high relevance score. In particular, a semantic query consisting of one or more keywords with diverse importance can be effectively handled by using the relevance scoring function effectively reflecting the diversity of semantic relationships and query keywords. In general, keyword queries input for a searching consist of two to four keywords, so the present invention's effectiveness for a multi-keyword query can remarkably contribute improvements in actual search performance.

Moreover, because a weight value can be determined by automatically analyzing ontology without the intervention of a domain expert, complicated, sizable ontology can be effectively handled. Over the current trend that the increase in data leads to the increase in the complexity and size of ontology, the present invention can become a core technology for realizing a semantic search.

Furthermore, the present invention can provide a simple, accurate search service to users, thus the present invention can be useful for a search service such as a Web search engine, a portal site, an electronic library, and the like, and accordingly, the quality of various services associated with searching and demand can be improved.

While the present invention has been shown and described in connection with the exemplary embodiments, it will be apparent to those skilled in the art that modifications and variations can be made without departing from the spirit and scope of the invention as defined by the appended claims.

What is claimed is:

1. A semantic search system using a semantic ranking scheme comprising:
    an ontology analyzer using a computer to analyze ontology data related to a search target to determine a weight value of each property wherein the ontology data comprises DBLP and IMDB data sets;
    a semantic path extractor extracting all the semantic paths between resources and query keywords and determining a weight value of each extracted semantic path according to a semantic path weight value determination scheme by using the weight value of each property;

a relevant resource searcher traversing an instance graph of ontology based on a semantic path having a pre-set length and weight value of more than an expectation level to search resources that have a semantic relationship with the query keywords and are declared as a type presented in the query; and a semantic relevance ranker selecting a top-k results having the highest rank from among the candidate results extracted by the relevant resource researcher by using a relevance scoring function;

wherein the relevance scoring function reflects the number of meaningful semantic paths between resources and keywords, the coverage of keywords and the distinguishability of keywords related to the resources;

wherein the relevance scoring function is represented by:

$$\text{Rank}(a, K) = 1 - \left[ \frac{\sum_{1 \leq i \leq |K|} (D(k_i) \cdot (1 - NR(a, k_i)))^p}{\sum_{1 \leq i \leq |K|} D(k_i)^p} \right]^{\frac{1}{p}}$$

wherein Rank(a,K) is a relevance scoring function with respect to a set of query keywords K of a resource 'a', wherein NR(a,k) is a normalized relation degree of resource 'a' with respect to a keyword $k_i$ which has a value greater than zero and less than or equal to 1, and wherein $D(k_i)$ is subject discriminative power of the keyword $k_i$ and p is a tuning parameter for controlling AND-semantics;

wherein the $NR(a,k_i)$ is calculated by:

$$NR(a, k_i) = \frac{R(a, k_i)}{\max_{a_m \in A} R(a_m, k_i)} \text{ for } k_i \in K$$

wherein $R(a,k_i)$ is a relation degree of resource 'a' with respect to the keyword $k_i$ max $R(a_m,k_i)$ is a maximum value of a relation degree, $a_m$ is a resource which makes $R(a_m,k_i)$ a maximum value and 'A' is a set of resources; and $R(a,k_i)$ is calculated by equation shown below:

$$NR(a, k_i) = \frac{R(a, k_i)}{\max_{a_m \in A} R(a_m, k_i)} \text{ for } k_i \in K$$

wherein $R(A,k_i)$ is a relation degree of resource 'a' with respect to the keyword $k_i$ max $R(a_m,k_i)$, is a maximum value of a relation degree, $a_m$ is a resource which makes $R(a_m, k_i)$ a maximum value and 'A' a set of resources; and $R(a,k_i)$ is calculated by:

$$R(a, k_i) = \sum_{ip \in IP(a,k_i)} W(ip), \text{ for } k_i \in K$$

wherein $IP(a,k_i)$ is a set of all the semantic path instances existing between the resource 'a' and the keyword $k_i$, 'ip' is an element of the set 'IP(a, ki)' and W(ip) is a weight value of a semantic path instance 'ip';

wherein $D(k_i)$ is calculated by:

$$D(k_i) = \frac{irf(k_i)}{\max_{k_m \in K} irf(k_m)}$$

where $k_m$ is an element of the K and km makes $irf(k_m)$ a maximum value where $irf(k_i)$ is calculated by:

$$irf(k_i) = \log \frac{|DV|}{|DV_{k_i}|}$$

where DV comprises a set of data values on an ontology instance graph, and $DV_{ki}$ comprises a set of data values including a keyword $k_i$.

2. The system of claim 1, further comprising:
a database management system (DBMS) storing the weight value of each property determined by the ontology analyzer together with the ontology data.

3. The system of claim 1, wherein a weighing method for property determines a property weight value according to discriminative power of a property and a predictability of a subject given the object, and vice versa, of a property.

4. The system of claim 3, wherein the property weight value is determined by the equation shown below:

$$w(p(d,r)) = \alpha \cdot I(p(d,r)) + \beta \cdot MI(p(d,r))$$

where w(p(d,r)) is a property weight value, I(p(d,r)) is a subject discriminative power of a property, MI(p(d,r)) is the predictability of the subject given the object, and vice versa, d is a domain, r is a range, and α and β are tuning parameters (0<α, β≦1).

5. The system of claim 1, wherein the weight value of the semantic path is determined by the equation shown below:

$$W(sp) = \left( \prod_{p(d,r) \in sp} w(p(d, r)) \right) \cdot \delta^{length(sp)-1}$$

where W(sp) is a weight value with respect to a semantic path, sp is a semantic path, w(p(d,r)) is a property weight value, length(sp) is the number of properties constituting a semantic path, and δ is a tuning parameter reflecting a penalty over the length of a semantic path (0<δ≦1).

* * * * *